US012809960B2

(12) United States Patent
Alameh et al.

(10) Patent No.: US 12,809,960 B2
(45) Date of Patent: Nov. 24, 2026

(54) CONTEXTUAL METHOD FOR ENABLING PASSIVE LISTENING ENGAGEMENT

(71) Applicant: Dell Products L.P., Round Rock, TX (US)

(72) Inventors: Rachid M. Alameh, Crystal Lake, IL (US); Jarrett Simerson, Northbrook, IL (US); Marc Randall Hammons, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 18/940,313

(22) Filed: Nov. 7, 2024

(65) Prior Publication Data

US 2026/0127257 A1 May 7, 2026

(51) Int. Cl.
*G06F 21/00* (2013.01)
*G06F 21/32* (2013.01)

(52) U.S. Cl.
CPC .................................... *G06F 21/32* (2013.01)

(58) Field of Classification Search
CPC ........................................................ G06F 21/32
See application file for complete search history.

(56) References Cited

U.S. PATENT DOCUMENTS 10,904,246 B2 * 1/2021 Chari ...................... H04L 63/08
12,020,692 B1 * 6/2024 Ryali ...................... G10L 15/08
2015/0371639 A1 * 12/2015 Foerster .................. G10L 17/06 704/233
2017/0068513 A1 * 3/2017 Stasior .................... G10L 15/22
2021/0225378 A1 * 7/2021 Montemurro ........... G06F 21/32
2021/0249035 A1 * 8/2021 Bone ....................... G10L 25/63
2022/0101847 A1 * 3/2022 Receveur ................ G10L 15/22
2022/0246023 A1 * 8/2022 Tannenbaum ......... G08B 13/22
2022/0292134 A1 * 9/2022 Shahbazi Mirzahasanloo ........... G06F 21/32
2022/0328050 A1 * 10/2022 Hennig ................... G10L 17/22
2023/0336694 A1 * 10/2023 Wexler .................... G10L 25/63

OTHER PUBLICATIONS

Zhang et al., "IoT Security: Ongoing Challenges and Research Opportunities," 2014 IEEE 7th International Conference on Service-Oriented Computing and Applications, Matsue, Japan, pp. 230-234 (Year: 2014).*
Holcomb et al., "Power-Up SRAM State as an Identifying Finger-print and Source of True Random Numbers," in IEEE Transactions on Computers, vol. 58, No. 9, pp. 1198-1210, Sep. 2008.*

* cited by examiner

*Primary Examiner* — Morshed Mehedi
(74) *Attorney, Agent, or Firm* — WOMBLE BOND DICKINSON (US) LLP

(57) ABSTRACT

Methods and systems for managing operation of data processing systems are disclosed. To manage operation of the data processing systems, access controls may be selected and enforced based on inferred users of the data processing systems. The users may be inferred based on sensing of the environments around the data processing systems. During the inferencing process, the types of the environments may be taken into account to improve a likelihood of identifying users that are present in the environments and/or conditions in the environment that impact security of the data processing systems.

20 Claims, 7 Drawing Sheets

CONTEXTUAL METHOD FOR ENABLING PASSIVE LISTENING ENGAGEMENT

FIELD

Embodiments disclosed herein relate generally to system management. More particularly, embodiments disclosed herein relate to systems and methods to manage use of systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
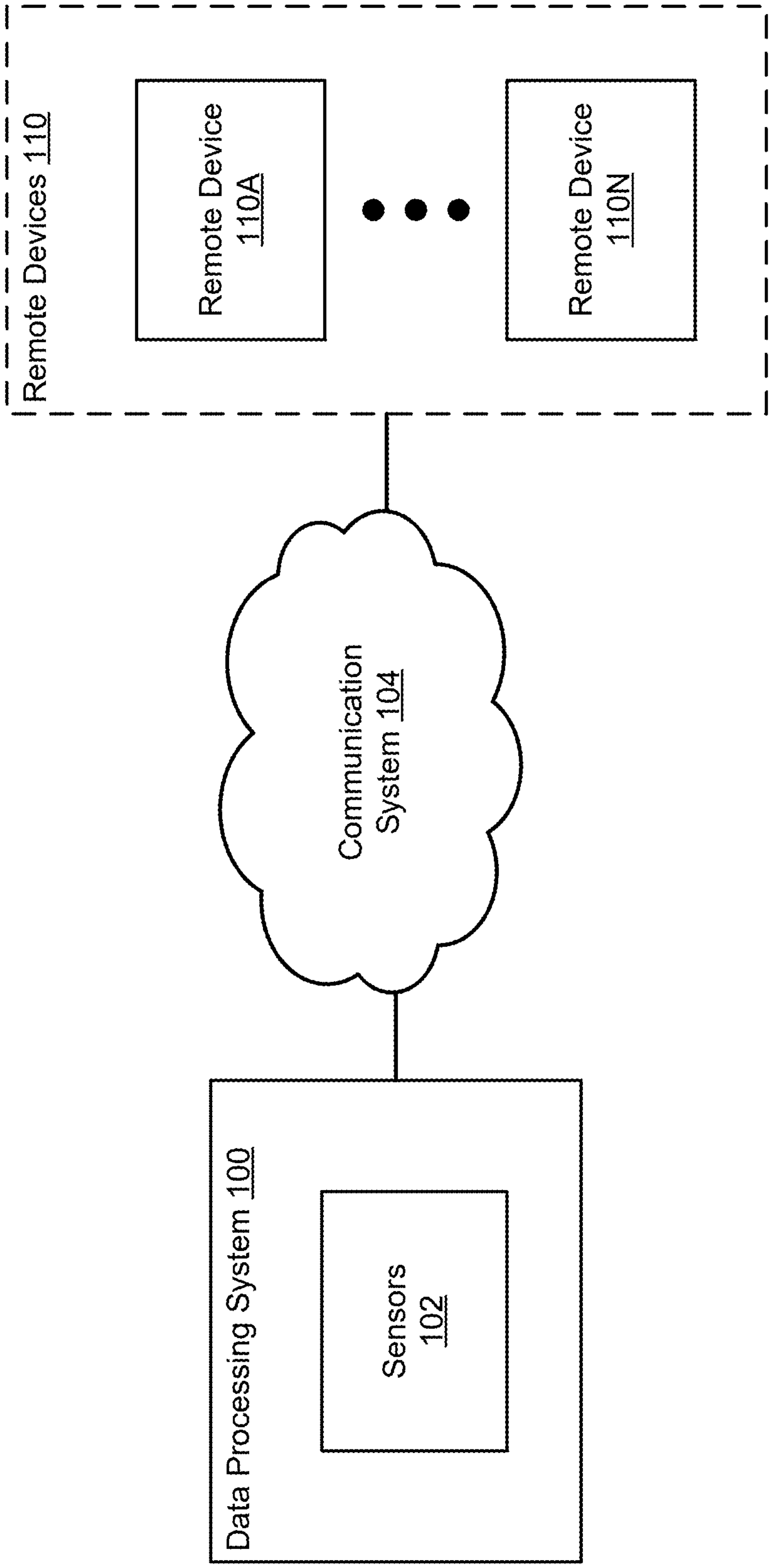
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of the data processing systems, access controls may be enforced over time. The access controls may limit use of the data processing systems to reduce the likelihood of malicious user using the data processing systems.

To decide how to enforce access controls, the data processing systems may analyze local environments to infer whether authorized or unauthorized users are likely using the data processing systems. The local environments may be analyzed by identifying (i) voices present in the environments, and (ii) types (e.g., contexts) of the environments. The contexts may be used to select basis of comparison for the voices to identify whether the voices likely correspond to authorized users.

By using environments as contexts, a data processing systems in accordance with an embodiment may be more likely to accurately ascertain whether authorized users are using the data processing systems. Thus, embodiments disclosed herein may address, among others, the technical problem of use identification in complex environments. By using a type of the environment as a context, basis for comparison may be selected in a manner that is likely to result in more accurate identifications of users. Thus, the security and usability of data processing systems may be improved through more accurate user identification.

In an embodiment, a method for managing operation of a data processing system is provided. The method may include obtaining audio from a first environment around the data processing system using an audio sensor of the data processing system; classifying the audio to obtain a context for the first environment; obtaining, from a repository, at least one audio sample of a user of the data processing system while the user is present in a second environment, the at least one audio sample being classified in the context; comparing the audio to the at least one audio sample to identify a likelihood of a first voice from the audio being a voice of the user; selecting, based on the likelihood, an access control to be applied to the data processing system; and providing computer implemented services using the data processing system based on the access control.

The method may also include obtaining location data for the data processing system. The access control may also be selected based on the location data.

Selecting the access control may include, when the likelihood falls into a first likelihood range: concluding that no access is to be granted; when the likelihood falls into a second likelihood range: concluding that full access is to be granted; and when the likelihood falls into a third range: comparing the location data to a known location list; in a first instance of the comparing where the location data indicates that the data processing system is not located at any location of the known location list: concluding that no access is to be granted, and in a second instance of the comparing where the location data indicates that the data processing system is located at one location of the known location list: concluding that limited access is to be granted.

The method may also include, prior to obtaining the audio, obtaining an audio clip of the user while the user is present in a third environment; obtaining video data of the user while the audio clip is obtained; filtering the audio clip based on activity of lips of the user in the video data to obtain a new audio sample; classifying the new audio sample to obtain a second context for the third environment; and adding the new audio sample to the repository using the second context to group the new audio sample with other audio samples that also have the second context.

The method may also include using the new audio sample and the other audio samples to obtain a representative audio sample for the second context.

The representative audio sample may be an average of the new audio sample and the other audio samples.

The method may also include, after selecting the access control: monitoring the first environment for occurrences of prescribed events; and re-evaluating the access control based on the occurrences.

The prescribed events may include changes in a cardinality of a number of speakers present in the first environment.

Monitoring the first environment may include obtaining passive audio samples of the first environment; in an instance of the obtaining of the passive audio samples where a change in a cardinality of a number of speakers present in the first environment based on the passive audio samples is identified: obtaining presence data for the user; in an instance of the obtaining where the presence data indicates that the user is continuously present with respect to the data processing system: concluding that no prescribed event has occurred; in an instance of the obtaining where the presence data indicates that the user is not continuously present with respect to the data processing system: concluding that an occurrence of the occurrences of the prescribed event has occurred.

The method may also include setting a rate of the monitoring based on presence of the user with respect to the data processing system and/or a location of the data processing system with respect to locations of a known location list.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other types of services that may be providing with a computing device.

To provide the computer implemented services, the components of the system may generate, read, store, compare, and use data over time. The data may be stored locally and/or remotely.

To provide the computer implemented services, the components of the system may provide users with user interfaces through which the computer implemented services may be accessed. The user may utilize human interface devices (e.g., mouse, keyboard, etc.) to provide user input to the system to use the computer implemented services.

However, malicious users may attempt to use the human interface devices to coopt the computer implemented services. For example, malicious users may provide the system with user input that causes the system to provide computer implemented services that are different from those requested by the user (e.g., an authorized user), to provide access to sensitive data and to which the malicious users are not to have access, and/or otherwise coopt use of the system from that desired by the authorized users.

In general, embodiments disclosed herein may provide methods, systems, and/or devices for providing computer implemented services to users in a manner that reduce the likelihood of malicious users coopting operation of the system. To do so, the system may utilize an access control system. The access control system may limit use of the systems based on identities of users.

To identify users, the system may utilize a range of sensors (e.g., audio, visual, etc.) to obtain information regarding the users and/or environments in which components of the system are positioned. Based on the information, the system may select and implement various access controls to provide, limit, and/or prevent use of the services.

By doing so, embodiments disclosed herein may reduce the likelihood of systems and/or computer implemented services provided by the systems from being hijacked or otherwise utilized by malicious users (e.g., users that are not authorized to be provided with computer implemented services and/or use of the systems).

To provide the above noted functionality, the system of FIG. 1 may include data processing system 100, remote devices 110, and communication system 104. Each of these components is discussed below.

Data processing system 100 may provide computer implemented services to users. For example, data processing systems 100 may include human interface devices (or proxies for them) through which users may provide input. The input may be used to direct and provide the computer implemented services.

To manage use of data processing system 100, data processing system 100 may implemented an access control framework. The access control framework may limit access and/or user of data processing system 100 to certain users. Enforce the access control framework, data processing system 100 may gather information regarding users and/or local environments using sensors 120, and infer which users (e.g., authorized or malicious) are likely utilizing the computer implemented services provided by data processing system 100. Based on the users and inferred likelihood, data processing system 100 may put in place various access controls. The access controls may grant use of all, or a portion, of the functionality of data processing systems 100 to users thereof, and/or prevent use of the functionality of data processing systems.

Sensors 102 may include any number and type of sensors. The sensors may include audio sensors (e.g., microphones), visual sensors (e.g., cameras), location sensors (e.g., global positioning system receivers), presence sensors (e.g., captive/displacement/interferometers to detect user presence), and/or other types of sensors. The sensors may be positioned to obtain information regarding an embodiment environment, such as to obtain audio and/or video clips reflecting the environment, identify locations of the environment, identify whether persons are present near data processing system 100, etc.

Remote devices 110 may cooperate with data processing system 100 to provide desired computer implemented services. Remote devices 110 may, for example, provide access to certain data used in the computer implemented services, store data on behalf of data processing systems 100, perform desired computations used in the computer implemented services, and/or may otherwise cooperate with data processing system 100 to provide the desired computer implemented services.

Figure 2A:
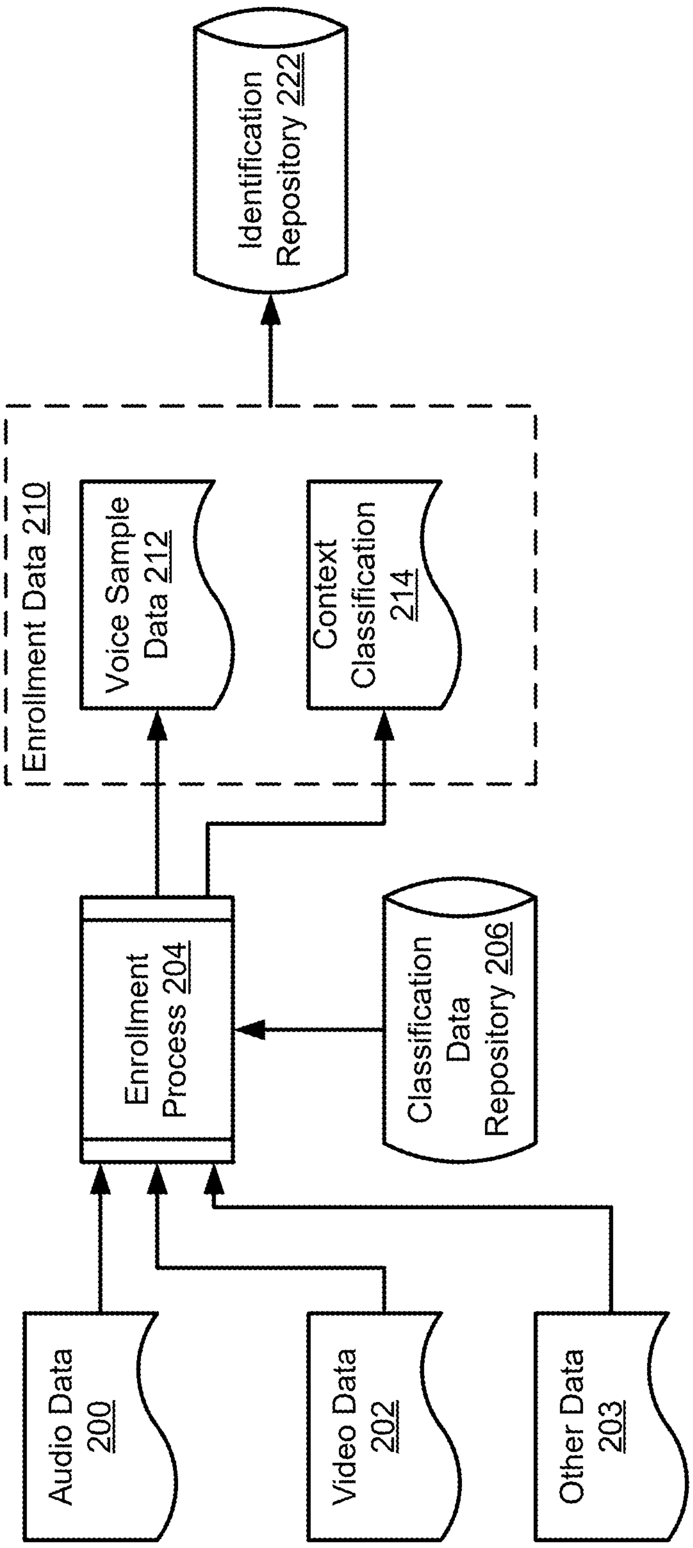
FIGS. 2A-2D show diagrams illustrating data flows in accordance with an embodiment.
Figure 2B:
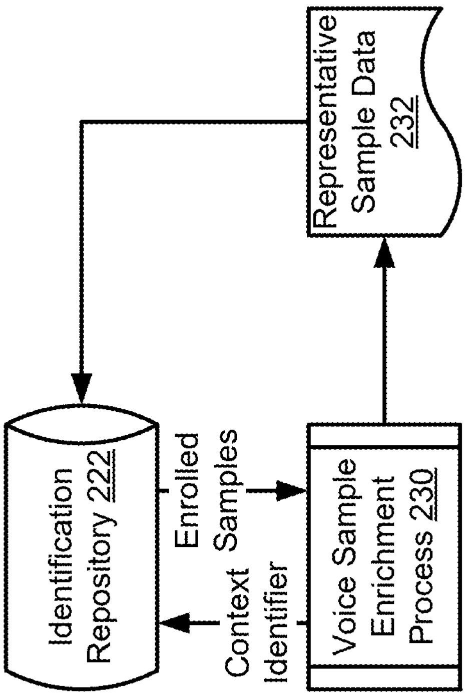
Figure 2C:
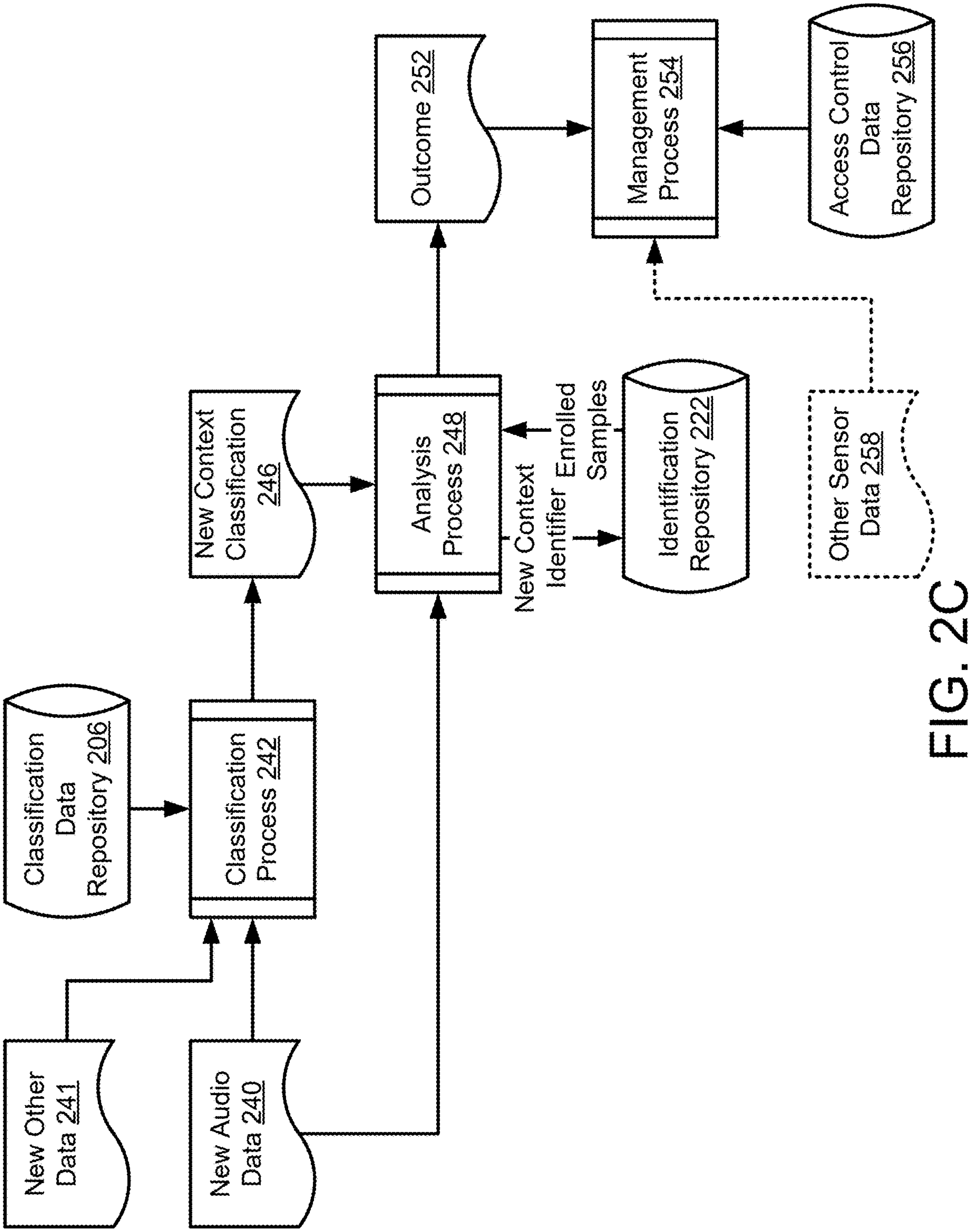
Figure 2D:
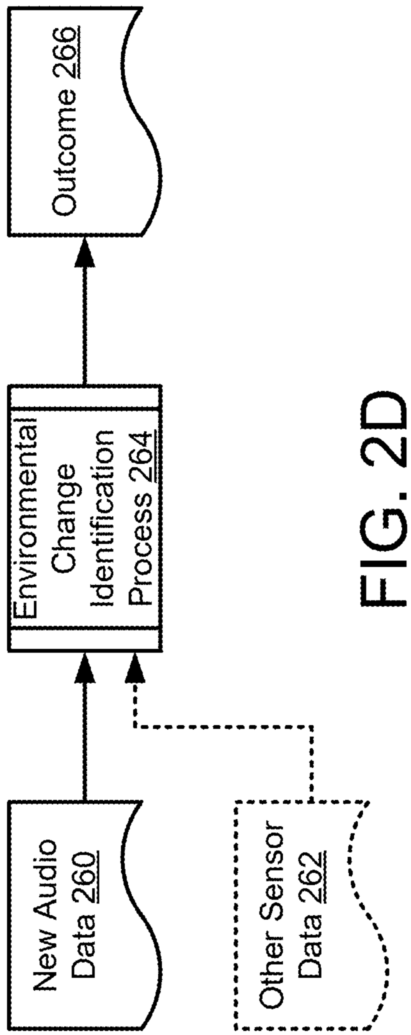
Figure 3:
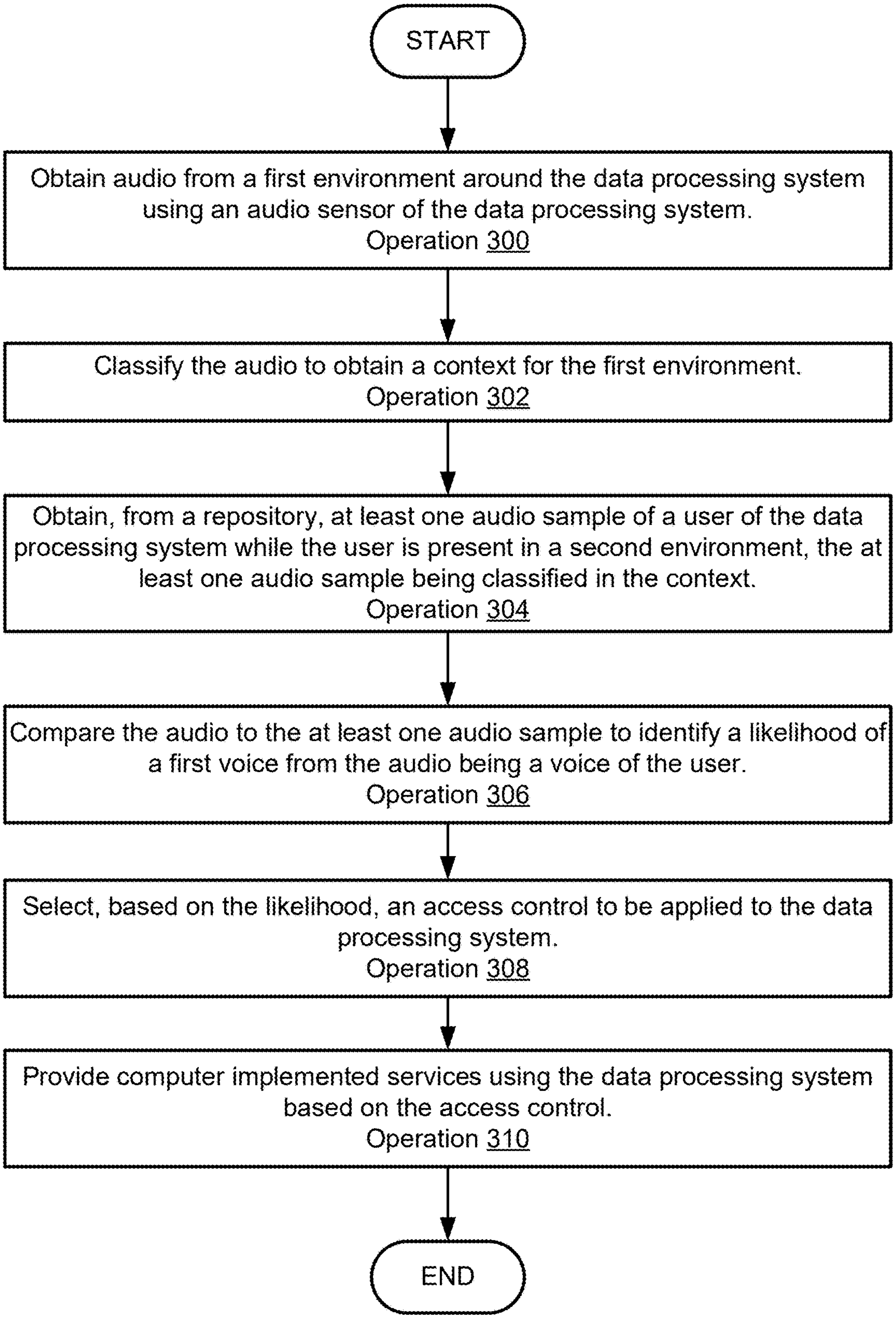
FIG. 3 shows a flow diagram illustrating a method of providing computer implemented services in accordance with an embodiment.

When providing their functionality, any of data processing system 100 and remote devices 110 (and/or portions thereof) may perform all, or a portion, of the actions, flows, and methods shown in FIGS. 2A-3.

Any of (and/or components thereof) data processing system 100 and remote devices 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2D. In these diagrams, flows of data and processing of data are illustrated using different sets of shapes. A first set of shapes (e.g., 200, 202, etc.) is used to represent data structures, a second set of shapes (e.g., 204, 230, etc.) is used to represent processes performed using and/or that generate data, and a third set of shapes (e.g., 206, 222, etc.) is used to represent large scale data structures such as databases.

Turning to FIG. 2A, a first data flow diagram in accordance with an embodiment is shown. The first data flow diagram may illustrate data used in and data processing performed in establishing information usable to infer the users using a data processing system.

Generally, data processing system 100 may attempt to identify users by comparing sound and/or visual information from an environment to samples of environments in which authorized users are present. To establish the information usable to identify the users, a data processing system may monitor audio and/or video of an environment in which a user is present. Audio data 200 may be obtained using an audio sensor, and video data 202 may be obtained using a visual sensor. Audio data 200 may include a recording of audio from an environment around the data processing system, and video data 202 may include similar information. When a user is present in the environment, the audio and video data may capture the voice and/or likeness of the users as part of registration processes for authorized users.

However, in addition to the user, other entities may be present in the environment. For example, ventilation equipment may generate noise that is captured in audio data 200, in addition to the users voice. Consequently, if at some later time a new audio data of a user in a different environment is compared to audio data 200, the comparison process may incorrectly identify whether (i) the user is present in the different environment, (ii) changes in numbers of users in the different environment have occurred, etc. For example, different types and magnitudes of background noise may confuse comparison algorithms.

To obtain audio samples usable to identify users, changes in users, and/or other types of changes in the environment around data processing system 100, enrollment process 204 may be performed. During enrollment process 204, the background noise and/or other variable content of audio data 200 may be classified (e.g., to obtain context classification 214) with respect to a classification system. The classification system may be deterministic (e.g., may be defined), may be based on grouping (e.g., such as unsupervised learning, clustering, and/or may be based on other processes. The classification system may classify audio data with respect to aspects of the environment that contributed to audio data 200 other than presence of the user.

To facilitate the classification process, video data 202 may be analyzed to precisely identify when the user spoke during audio data 200 (e.g., as part of an enrollment phase for an authorized user). For example, video data 202 may be subject to image and/or video recognition to identify frames (and corresponding time periods) when the user spoke. The identified time periods may be used to filter audio data 200 into portions where (i) the user is speaking, and (ii) the user is not speaking. The portions where the user is not speaking may be used as a basis for classification as part of a classification processes that utilizes information obtained by other sensors as well for context. The other sensors may be used to obtain other data 203.

For example, frequency distributions (and/or temporal variation) of sound during the portions of time when the user is not speaking and other data 203 may be used to as a basis for the classification, along with other characteristics of the environment obtained using other types of sensors. To perform the classification, an unsupervised machine learning model may be used to group the frequency distributions of audio data 200 and other data 203, and/or other instances of audio data 200 and other data 203 taken when the user is in a variety of environments into groups. Each group may be treated as a classification. While described with respect to unsupervised learning, other grouping algorithms, trained inference models (e.g., supervised learning), and/or other algorithms may be used to classify audio data 200. The information used to perform the classification process may be stored in classification data repository 206 (e.g., which may include inference models, algorithms, etc.). While described with respect to sensor data, other data 203 may include other types of information such as state information for the data processing system, information derived from the sensor data (e.g., inferred emotional states of users), and/or other information usable to contextualize audio samples.

Via enrollment process 204, enrollment data 210 may be obtained. Enrollment data may include voice sample data 212 and context classification 214. Voice sample data 212 may include all of audio data 200, metadata identifying the portions of audio data 200, and/or only the portions of audio data tagged with metadata indicating that the user is speaking. Context classification 214 may indicate the context in which the user was speaking (e.g., classification for the environment in which the user is present and which other sources of noise are present).

Once obtained, enrollment data 210 may be stored in identification repository 222. Identification repository 222 may include any amount of enrollment data 210. Thus, any number of voice samples and corresponding contexts for the samples may be stored in identification repository 222.

Thus, via the data flow shown in FIG. 2A, data usable to ascertain whether access controls should be enforced may be obtained. However, the individual samples for a given context may present some degree of aberration due to transient effects in the environment. To establish representative samples for different contexts, the data flow shown in FIG. 2B may be performed.

Turning to FIG. 2B, a second data flow diagram in accordance with an embodiment is shown. The second data flow diagram may illustrate data used in and data processing performed in establishing representative samples for different contexts.

To obtain a representative sample for a given context, an identifier of the context may be used to filter identification repository 222 for audio samples having the given context. Corresponding enrolled samples may be obtained from identification repository 222.

Once obtained, voice sample enrichment process 230 may be performed. During voice sample enrichment, the enrolled samples may be average or otherwise processed to obtain a representative sample based on all of the samples for the context (or a repeating captures overtime and averaging of those captures that belong to similar contextual environments). For example, each sample for the context may have a same content (e.g., the user may say a same phrase, word, etc.). The voice sample data for each of the enrolled samples may be processed (e.g., each time point may be averaged or otherwise combined) to obtain representative sample data 232. While described with respect to averaging of a same phrase, it will be appreciated that the averaging or other processing may be performed on samples of voice of the user for a variety of different phrases and the averaging may be performed to obtain voice characteristics, rather than representative samples of the same phrase, which may be more applicable to a variety of future comparisons in which users say different phrases.

Once obtained, representative sample data 232 may be stored in identification repository 222 (e.g., may be tagged with the context identifier).

Thus, via the flows shown in FIGS. 2A-2B, data usable to ascertain whether access control should be enforced may be obtained. As will be discussed with respect to FIG. 2C, the data may be used to secure a data processing system against use by malicious users (e.g., unauthorized users).

Turning to FIG. 2C, a third data flow diagram in accordance with an embodiment is shown. The third data flow diagram may illustrate data used in and data processing performed in establishing information usable to infer whether authorized users are using a data processing system.

When a user initially begins to use a data processing system, the data processing system may initially need to identify the user and a level of authorization of the user to use the data processing system. Until the user is identified and level of authorization identified, the user may be prevented from using the data processing system (or access is limited based on confidence level, such as a user that is not fully identified may still control music in device but may not access email, for example).

To identify the user, new audio data 240 may be obtained. New audio data 240 may be recorded audio of an environment in which the data processing system is positioned. For example, when the data processing system is used, the data processing system may use sensors (audio, video, other types) to attempt to detect changes in sound in the environment (and/or other characteristics such as location, mode of device operation, persons near the data processing system, conditions of persons using the system, etc., in aggregate the new other data 241). If such changes in sound or other changed characteristics are identified, the data processing system may use the sensors to record audio thereby generating new audio data 240, may use other sensors to capture sensor measurements for new other data 241, and/or may derive information from existing data (e.g., system state) and/or newly capture sensor data to obtain derived information to add to new other data 241 (e.g., the derived information may relate to states of persons, the system, characteristics of the environment, etc.).

Once new other data 241 and new audio data 240 are obtained, classification process 242 may be performed. During classification process 242, a context classification for new audio data 240 may be obtained. For example, as discussed with respect to FIG. 2A, new audio data 240 may be classified using (i) an inference model, algorithm, or other information from classification data repository 206 and (ii) new other data 241. The classification may follow the classification system discussed with respect to FIG. 2A.

Once obtained, new context classification 246 may be used in analysis process 248. During analysis process 248, new audio data 240 may be compared to voice sample data from identification repository 222. For example, new context classification 246 may be used as a key to filter identification repository 222 to obtain only voice sample data that have the same context (e.g., based on the acoustical contextual environment, location, mode of operation of the device, various portions of other sensor data, etc.). In this manner, the environment in which the user is present may be taken into account when attempting to identify whether an authorized user is present in the environment.

Once the voice sample data is obtained, new audio data 240 may be compared to the voice sample data. For example, the representative sample and/or other voice sample data for the given context may be compared to the voice sample data. The comparison may be made via any comparison process. The comparison process may return an outcome (e.g., 252).

Outcome 252 may indicate (i) whether new audio data 240 indicates that a user is present in the environment and/or is trying to use the data processing system, and/or (ii) a level of confidence in the inferred presence of the user. For example, during the comparison process, various quantifications regarding a level of strength of the match may be obtained. The level of strength (or difference) of the match may be used as the level of confidence, or another metric based on the level of strength may be used as the level of confidence.

The level of confidence may be normalized to a particular range and/or may be bucketized into discrete buckets (e.g., each bucket may correspond to a particular range).

Once outcome 252 is obtained, management process 254 may be performed. During management process 254, access controls may be put in place based on outcome 252. The specific access control that is put in place may be based on policies included in access control data repository 256.

For example, access control data repository 256 may include policies that specify access controls that are to be enforced based on outcome 252. The policies may indicate that, when outcome 252 indicates that an authorized user is likely using data processing system 100, (i) full device access is to be granted when the confidence level in outcome 252 is within a first prescribed confidence level range (and/or outcome 252 falls within a first bucket, which may be a high bucket) with may be a high range, (ii) no device access is to be granted when the confidence level in outcome 252 is within a second prescribed confidence range (and/or outcome 252 falls within a second bucket, which may be a low bucket) with may be a low range, and (iii) limited device access may be granted based on other factors when the confidence level in outcome 252 is within a third prescribed confidence range (and/or outcome 252 falls within a third bucket, which may be a middle bucket) with may be a middle range. The reduced level of access may also be based on the type of data user wanting access to (confidential or not, private or public data, . . . ). In other words, different classifications for data may limit the data which can be accessed based on the applied access control.

In the event that the limited access is granted, then other sensor data 258 may be collected and used to determine the extent of the limited access. Other sensor data 258 may include information regarding a location of data processing system 100, and/or other aspect of the environment in which the data processing system resides. For location, the location may be compared to a list of known locations (e.g., office, home, etc.). If the location is one of the list, then the limited access may be granted. If the location is not one of the list, then no or much more limited access may be granted (e.g., home). For example, in contrast to full device access, limited access may restrict (i) usable programs, (ii) accessible data, (iii) communications with other devices, and/or other aspects of operation of the data processing system. Other processes may be performed in analyzing other types of information to assess relative levels of risk in different access controls that may be applied.

While described with respect to three ranges/buckets, it will be appreciated that any number of buckets/ranges may be used without departing from embodiments disclosed herein. In such scenarios, progressively more restrictive access controls may be associated with the different buckets/ranges as the confidence level of outcome 252 decreases.

Additionally, while described with respect to the location of the data processing system, other information gathered by the data processing system (and/or other devices) may be used as a basis for selecting access controls for enforcement.

Once the access controls are identified, data processing system 100 may enforce the access controls on use of the data processing system 100 by the user.

Thus, via the flow shown in FIG. 2C, embodiments disclosed here may enable access controls to be automatically identified and enforced on data processing systems to limit the risk of malicious use of data processing system 100.

However, over time the environment in which data processing system 100 resides may change. To address changes to the environment, the flow shown in FIG. 2D may be performed.

Turning to FIG. 2D, a fourth data flow diagram in accordance with an embodiment is shown. The fourth data flow diagram may illustrate data used in and data processing performed in managing access controls enforced by data processing systems.

After access controls are initially put in place, the environment in which data processing system 100 resides may change. To take into account the changes in the environment, environment change identification process 264 may be performed.

During environmental change identification process 264, new audio data 260 and/or other sensor data 262 may be obtained and analyzed. During the analysis, new audio data 260 and other sensor data 262 may be analyzed to identify whether significant changes to the environment have occurred. If a significant change to the environment has occurred, then an outcome (e.g., 266) for the environment may be obtained, and a portion (e.g., 240-254) of the flow shown in FIG. 2C may be performed. Otherwise, outcome 266 may indicate that no action need be taken.

During change identification process 264, new audio data 260 and/or other sensor data 262 may be analyzed to identify (i) whether new voices are present in the environment (e.g., indicating that different users may be present), (ii) whether the voice of the user continues to be the only voice (e.g., with respect to 240 and 260), and (iii) whether the user has continued to be present in the environment even though others users may also be present/changed. If new voices are identified, then outcome 266 may be generated to indicate that the environment has significantly changed, and the flow of FIG. 2C may be performed.

However, the voice of the user continues to be the only voice that is heard in new audio data 260 and/or continuous presence of the user is maintained even though other voices are also heard in new audio data 260, then outcome 266 may be generated to indicate that no significant change to the environment has occurred and the flow shown in FIG. 2C need not be performed.

To identify whether the user continues to be present, both new audio data 260 and/or other sensor data 262 may be used. For example, in addition to audio analysis of new audio data 260 with respect to the user, other sensor data 262 may include information from other sensors (e.g., bump, position, location sensing, etc.) that monitors for presence of the user. If continuous presence of the user is identified, then presence of other voices in new audio data 260 may not be significant enough to trigger performance of the flow shown in FIG. 2C.

In addition to ascertaining whether to reevaluate access controls via the flow shown in FIG. 2C, the rate at which monitoring of the environment is performed may also be changed. For example, other sensor data 262 may be used to identify a location of data processing system 100 and/or new audio data 260 may be analyzed to identify presence of other voices. If data processing system 100 is located at a known location or the number of other devices falls below a threshold level and/or meets other criteria, then the rate at which new audio data is obtained and analyzed overtime may be reduced. In contrast, if data processing system 100 is not located at a known location or changing numbers of other voices are present in new audio data 260 (and/or other criteria is met), then the rate at which new audio data is obtained may be increased. In this manner, the rate at which the environment is sampled for changes may be adjusted to follow the risk of such changes occurring and which may necessitate changes in access controls.

Thus, via the data flow shown in FIG. 2D, embodiments disclosed herein may adjust access controls enforced by data processing systems over time to align with changing environments.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage operation of data processing systems to provide computer implemented services. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing operation of a data processing system in accordance with an embodiment is shown. The method may be performed by any of the components of the system of FIG. 1.

At operation 300, audio from a first environment around a data processing system may be obtained using an audio sensor of the data processing system. The audio may be obtained by recording the audio using the audio sensor.

At operation 302, the audio is classified to obtain a context for the first environment. The audio may be classified using a classification system. The classification system may be a clustering algorithm, unsupervised machine learning, a trained inference model (e.g., supervised machine learning), and/or other types of systems for classifying the audio. The context may be based on sources of noise from the environment and/or other entities that are not users. Additionally, the context may also be based on information from other types of sensors (e.g., non-audio sensors). The combination of audio and other sensor data may enable different environments to be more granularly and accurately identified.

At operation 304, at least one audio sample of a user of the data processing system is obtained. The at least one audio sample may be for the user while the user is in a second environment. The at least one audio sample may be classified in the context obtained at operation 302. The at least one audio sample may be obtained by using the context for the first environment as a key to search a repository in which audio samples for the user in different environments (e.g., being different contexts) are stored. Each audio sample may be tagged with a context of the environment from which the audio sample was obtained. Thus, the at least one audio sample and the audio are likely to have similar noise pollution (e.g., noise not generated by the user).

At operation 306, the audio is compared to the at least one audio sample to identify a likelihood of a first voice from the audio being a voice of the user. The audio may be compared via any comparison algorithm. The comparison algorithm may provide a level of confidence in the first voice being the voice of the voice of the user. Any quantitative comparison process may be used to ascribe the level of confidence.

At operation 308, an access control to be applied to the data processing system is selected based on the likelihood. The access control may be identified by using the likelihood as a key to identify a policy. The policy may specify the access control. The access control may be any type of access control (e.g., limitation of use of the data processing system, such as application, data, communication, etc. limitations).

The policies may each be associated with different likelihood ranges (and/or other information) and/or bucketized versions of the likelihood ranges. The policies may specify different access controls such as (i) full access, (ii) no access, and (iii) limited access based on other information such as location of the data processing system with respect to known locations (e.g., generally more restrictions may be enforced by the access controls when the data processing system is away from known locations such as a home of an authorized user, a work location, etc.).

In addition to being based on the likelihood, the access control may also be based on location data. The location data may be a location of the data processing system with respect to known locations. More restrictive access controls may be selected if the data processing system is not with any of the known locations.

At operation 310, computer implemented services are provided with the data processing system using the access control. The computer implemented services may be provided by updating operation of the data processing system based on the access control, obtaining user input, and providing computer implemented services based on the user input and using the updated data processing system.

The method may end following operation 310.

To obtain content of the repository, audio clips of the user in a variety of environments may be obtained along with corresponding video data. The video data may be used to filter the audio clips to obtain audio samples (e.g., of only when the user is speaking). The audio samples may be similarly classified and stored so that in the future the audio samples for the context may be identified and used as a basis for comparison of new audio obtained in the future.

The audio clips for a given context may be averaged or otherwise combined to obtain representative samples (e.g., master samples) for each context.

After a given access control is applied, the data processing system may continue to monitor for changes in an environment. For example, the data processing system may passively monitor audio for presence of new user, continued presence of the user, etc. This information (and/or other information) may be used to conclude whether access controls should be reevaluated, and/or rates at which the environment should be evaluated.

Thus, using the method shown in FIG. 3, embodiments disclosed herein may improve the likelihood of access controls being put in place to restrict access of the system against use by unauthorized users (e.g., malicious users).

Figure 4:
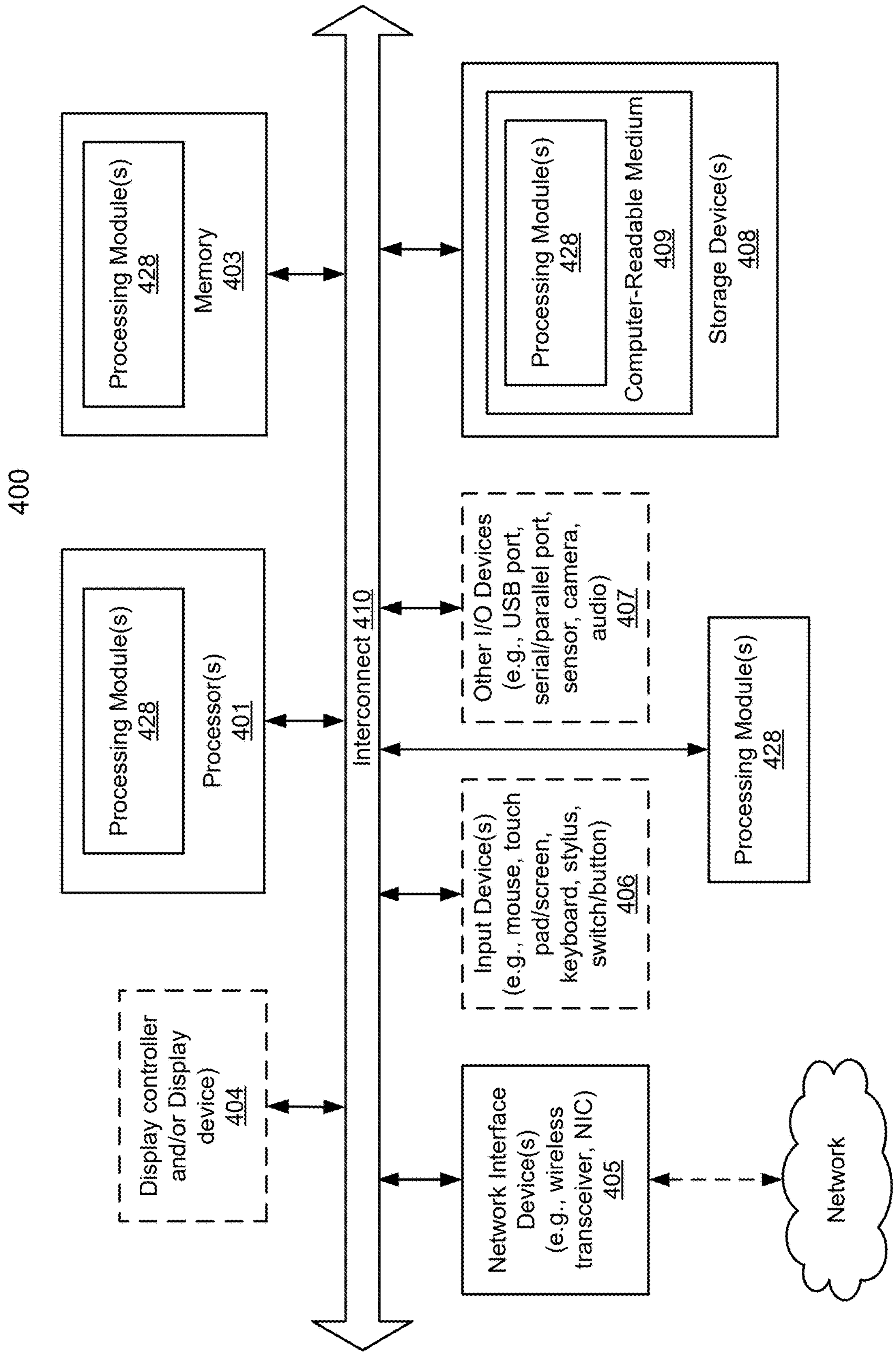
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above.

Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium. Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:

obtaining audio from a first environment around the data processing system using an audio sensor of the data processing system, the data processing system being used by a user within the first environment, and the audio from the first environment comprises human and non-human noises within the first environment;

classifying the audio to obtain a context for the first environment, the classifying being based on identifying the human and non-human noises to determine information regarding the first environment and the context being based on sources of the human and non-human noises;

obtaining, from a repository, at least one audio sample of the user of the data processing system while the user is present in a second environment, the at least one audio sample being classified in the context;

comparing the audio to the at least one audio sample to identify a likelihood of a first voice from the audio, from among the human and non-human noises within the audio of the first environment, being a voice of the user;

selecting, based on the likelihood, an access control to be applied to the data processing system; and providing computer implemented services using the data processing system based on the access control.

2. The method of claim 1, further comprising:

obtaining location data for the data processing system, the location data indicating a geographic location at which the data processing system is currently physically located and is obtained by the data processing system using a location sensor installed in the data processing system, wherein the access control is also selected based on the location data, and the access control limits access to different types of data hosted by the data processing system.

3. The method of claim 2, wherein selecting the access control comprises:

when the likelihood falls into a first likelihood range: concluding that no access is to be granted;

when the likelihood falls into a second likelihood range: concluding that full access is to be granted; and when the likelihood falls into a third range:

comparing the location data to a known location list;

when comparing the location data to the known location list indicates that the data processing system is not located at any location of the known location list: concluding that no access is to be granted; and when comparing the location data to the known location list indicates that the data processing system is located at one location of the known location list: concluding that limited access is to be granted.

4. The method of claim 1, further comprising:

prior to obtaining the audio, and by the data processing system using an audio sensor and one or more non-audio sensors installed within the data processing system:

recording, using the audio sensor, an audio clip of the user while the user is present in a third environment different from the first environment;

obtaining, using one of the one or more non-audio sensors, a video clip of the third environment and of the user within the third environment while the audio clip is obtained by the audio sensor;

confirming the audio clip contains the voice of the user based on lip movement of the user identified within the video clip to obtain a new audio sample for the user;

classifying the new audio sample to obtain a second context for the third environment; and adding the new audio sample to the repository using the second context to group the new audio sample with other audio samples that also have the second context.

5. The method of claim 4, further comprising:

using the new audio sample and the other audio samples to obtain a representative audio sample for the second context.

6. The method of claim 5, wherein the representative audio sample is an average of the new audio sample and the other audio samples.

7. The method of claim 1, further comprising:

after selecting the access control and while the user is using the computer implemented services provided by the data processing system based on the access control:

monitoring, by the data processing system and using one or more sensors of the data processing system, the human and non-human noises and other non-audio content within the first environment for occurrences of prescribed events, the audio sensor being one of the one or more sensors; and re-evaluating the access control based on the occurrences of the prescribed events.

8. The method of claim 7, wherein the prescribed events comprise:

changes in a cardinality of a number of speakers present in the first environment.

9. The method of claim 8, wherein monitoring the first environment, after selecting the access control and while the user is using the computer implemented services provided by the data processing system based on the access control, comprises:

obtaining passive audio samples of the first environment;

in an instance of the obtaining of the passive audio samples where a change in the cardinality of the number of speakers present in the first environment based on the passive audio samples is identified:

obtaining presence data for the user;

when the presence data indicates that the user is continuously present with respect to the data processing system:

concluding that no prescribed event has occurred; and when the presence data indicates that the user is not continuously present with respect to the data processing system:

concluding that an occurrence of the occurrences of the prescribed event has occurred.

10. The method of claim 7, further comprising:

setting a rate of the monitoring based on presence of the user with respect to the data processing system and/or a location of the data processing system with respect to locations of a known location list.

11. A non-transitory machine-readable medium having instructions stored therein, which when executed by a processor, cause operations for managing a data processing system to be performed, the operations comprising:

obtaining audio from a first environment around the data processing system using an audio sensor of the data processing system, the data processing system being used by a user within the first environment, and the audio from the first environment comprises human and non-human noises within the first environment;

classifying the audio to obtain a context for the first environment, the classifying being based on identifying the human and non-human noises to determine information regarding the first environment and the context being based on sources of the human and non-human noises;

obtaining, from a repository, at least one audio sample of a user of the data processing system while the user is present in a second environment, the at least one audio sample being classified in the context;

comparing the audio to the at least one audio sample to identify a likelihood of a first voice from the audio, from among the human and non-human noises within the audio of the first environment, being a voice of the user;

selecting, based on the likelihood, an access control to be applied to the data processing system; and providing computer implemented services using the data processing system based on the access control.

12. The non-transitory machine-readable medium of claim 11, wherein the operations further comprise:

obtaining location data for the data processing system, wherein the access control is also selected based on the location data.

13. The non-transitory machine-readable medium of claim 12, wherein selecting the access control comprises:

when the likelihood falls into a first likelihood range: concluding that no access is to be granted;

when the likelihood falls into a second likelihood range:

concluding that full access is to be granted; and when the likelihood falls into a third range:

comparing the location data to a known location list;

when comparing the location data to the known location list indicates that the data processing system is not located at any location of the known location list: concluding that no access is to be granted; and when comparing the location data to the known location list indicates that the data processing system is located at one location of the known location list: concluding that limited access is to be granted.

14. The non-transitory machine-readable medium of claim 11, wherein the operations further comprise:

prior to obtaining the audio obtaining an audio clip of the user while the user is present in a third environment;

obtaining video data of the user while the audio clip is obtained;

filtering the audio clip based on activity of lips of the user in the video data to obtain a new audio sample;

classifying the new audio sample to obtain a second context for the third environment; and adding the new audio sample to the repository using the second context to group the new audio sample with other audio samples that also have the second context.

15. A data processing system, comprising:

a processor; and a memory coupled to the processor to store instructions, which when executed by the processor, cause operations for managing the data processing system, the operations comprising:

obtaining audio from a first environment around the data processing system using an audio sensor of the data processing system, the data processing system being used by a user within the first environment, and the audio from the first environment comprises human and non-human noises within the first environment;

classifying the audio to obtain a context for the first environment, the classifying being based on identifying the human and non-human noises to determine information regarding the first environment and the context being based on sources of the human and non-human noises;

obtaining, from a repository, at least one audio sample of a user of the data processing system while the user is present in a second environment, the at least one audio sample being classified in the context;

comparing the audio to the at least one audio sample to identify a likelihood of a first voice from the audio, from among the human and non-human noises within the audio of the first environment, being a voice of the user;

selecting, based on the likelihood, an access control to be applied to the data processing system; and providing computer implemented services using the data processing system based on the access control.

16. The data processing system of claim 15, wherein the operations further comprise:

obtaining location data for the data processing system, wherein the access control is also selected based on the location data.

17. The data processing system of claim 16, wherein selecting the access control comprises:

when the likelihood falls into a first likelihood range: concluding that no access is to be granted;

when the likelihood falls into a second likelihood range: concluding that full access is to be granted; and when the likelihood falls into a third range:

comparing the location data to a known location list;

when comparing the location data to the known location list indicates that the data processing system is not located at any location of the known location list: concluding that no access is to be granted; and when comparing the location data to the known location list indicates that the data processing system is located at one location of the known location list: concluding that limited access is to be granted.

18. The data processing system of claim 15, wherein the operations further comprise:

prior to obtaining the audio obtaining an audio clip of the user while the user is present in a third environment;

obtaining video data of the user while the audio clip is obtained;

filtering the audio clip based on activity of lips of the user in the video data to obtain a new audio sample;

classifying the new audio sample to obtain a second context for the third environment; and adding the new audio sample to the repository using the second context to group the new audio sample with other audio samples that also have the second context.

19. The method of claim 1, wherein the audio from the first environment is obtained by the data processing system recording noises occurring in the first environment around the data processing system using an audio sensor of the data processing system, and classifying the audio to obtain the context further comprises obtaining the context using:

the noises recorded by the audio sensor as part of the audio from the first environment, and other sensor data associated with other non-audio content within the first environment, the other sensor data being obtained by non-audio sensors of the data processing system.

20. The method of claim 1, wherein the second environment is different from the first environment, and the at least one audio sample of the user was pre-recorded by the data processing system using the audio sensor while the user was present in the second environment.

* * * * *